United States Patent [19]
Kurita

[11] Patent Number: 5,864,634
[45] Date of Patent: Jan. 26, 1999

[54] IMAGE PROCESSING APPARATUS AND METHOD

[75] Inventor: Mitsuru Kurita, Yokohama, Japan

[73] Assignee: Canon Kabushiki Kaisha, Tokyo, Japan

[21] Appl. No.: 638,335

[22] Filed: Apr. 26, 1996

[30] Foreign Application Priority Data

May 1, 1995 [JP] Japan ................................ 7-107332

[51] Int. Cl.⁶ ................................ H04N 1/46; G06K 9/00
[52] U.S. Cl. ........................ 382/167; 358/523; 358/527; 358/530
[58] Field of Search ....................... 382/162, 167; 358/500, 517, 523, 524, 537, 501, 527, 530

[56] References Cited

U.S. PATENT DOCUMENTS 4,769,696 9/1988 Utsuda et al. ............................ 358/80
4,893,178 1/1990 Matama .................................. 358/76

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

When an image subjected to color conversion processing is to be previewed on a monitor (217), image data are supplied from a synthesis unit (206) to an image memory unit (217). When an image subjected to paint or free color processing in an edit circuit (213) or an image synthesized by the synthesis unit (206) is to be previewed, an inverse LOG table for converting C, M, Y, and K image data into R, G, and B image data is set in a gamma correction unit (214), and image data are supplied from an edge emphasis unit (215) to the image memory unit (217). Therefore, a storage means can be used by methods suitable for both the image forming mode and the monitor display mode.

18 Claims, 17 Drawing Sheets

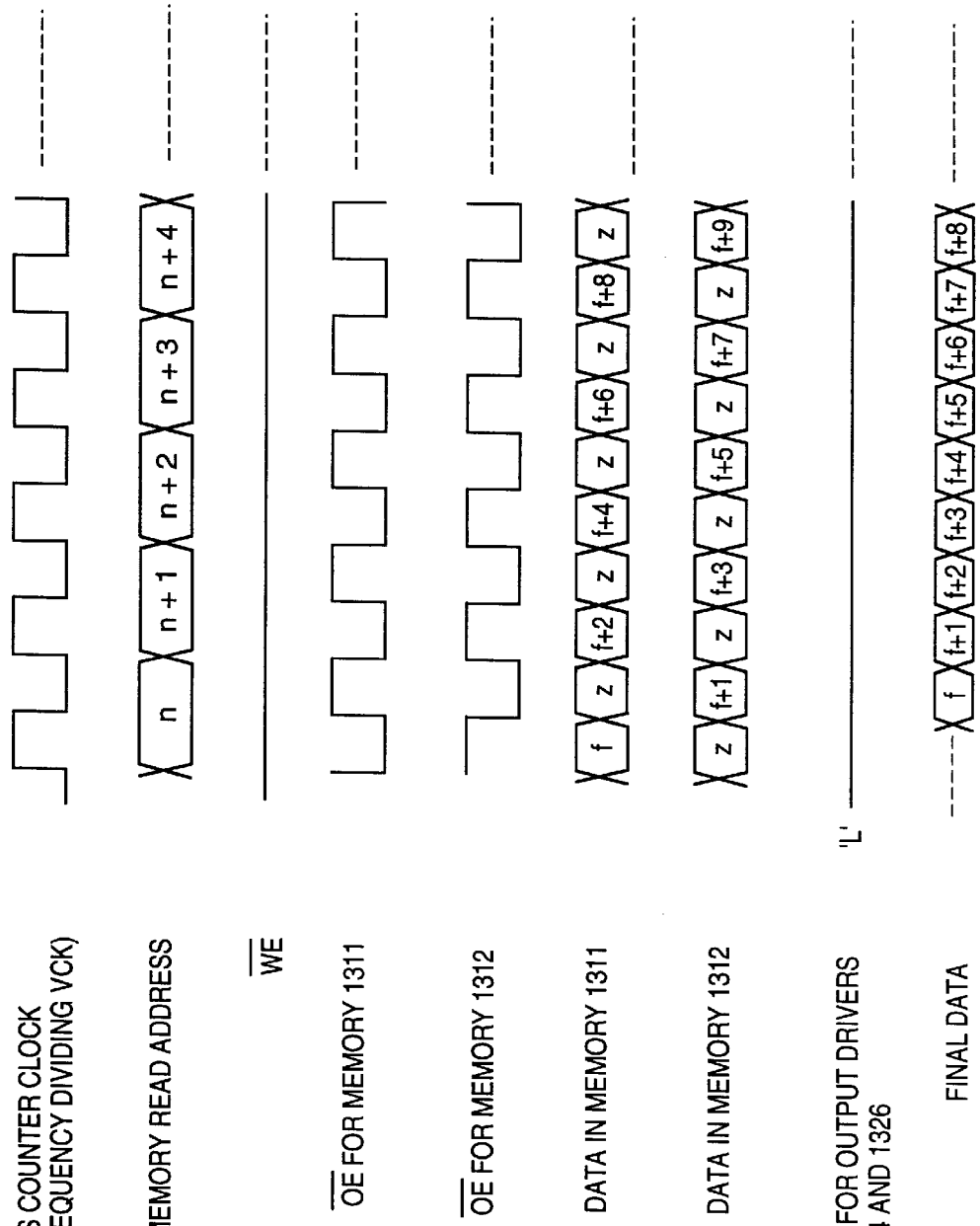

IMAGE PROCESSING APPARATUS AND METHOD

BACKGROUND OF THE INVENTION

The present invention relates to an image processing apparatus and method, and more particularly, to an image processing apparatus and method, which store image data in an image memory.

In recent years, the image quality and functions of digital copying machines have improved, and user's demands have been met in terms of color tones of an output image and its edit processing. In this situation, in order to obtain a desired output image, copying machines having a so-called preview function, which allows a user to confirm an image displayed on, e.g., a CRT in place of repetitively outputting an image onto a recording paper sheet, have become commercially available. In some of these machines, a read original image is displayed and confirmed using a monochrome liquid crystal display. However, in order to confirm the color tones of an output image in a color copying machine, a full-color display preview system is preferable.

On the other hand, in a digital color copying machine, a requirement for high-speed processing is strong, and in order to meet this requirement, a digital color copying machine which comprises four photosensitive drums and Y, M, C, and K developers in correspondence with these drums, has been proposed. In such machine, an image memory for compensating for spatial offsets between adjacent photosensitive drums is indispensable, and in order to realize higher-grade image processing, a full-page image memory is preferably arranged.

However, the above-mentioned prior art suffers the following problems. That is, when image data stored in the full-page image memory is subjected to processing equivalent to image processing of the copying machine main body in a software manner, and the processed data is displayed on a color monitor, a preview system can be constituted without largely modifying the hardware arrangement. However, when the copying machine main body has a large number of complex edit functions, the scale of a software program for the preview image processing increases, and its calculation amount also increases. In order to shorten the time required for forming a preview image, a high-speed hardware arrangement must be adopted, resulting in an increase in cost.

SUMMARY OF THE INVENTION

It is an object of the present invention to provide an image processing apparatus and method, which can use a storage means to be suitable for both the image forming mode and the monitor display mode.

In order to achieve the above object, according to a preferred embodiment of the present invention, an image processing apparatus having a plurality of image forming units, comprising input means for inputting image data, storage means for storing the image data, and read-out means for reading out image data at different positions of an identical image in correspondence with position differences of the image forming units from said storage means in an image forming mode, and reading out image data at the same position of an identical image from said storage means in a monitor display mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 is a timing chart showing the timings when a third image is read out from a memory.

DESCRIPTION OF THE PREFERRED EMBODIMENTS

Figure 1:
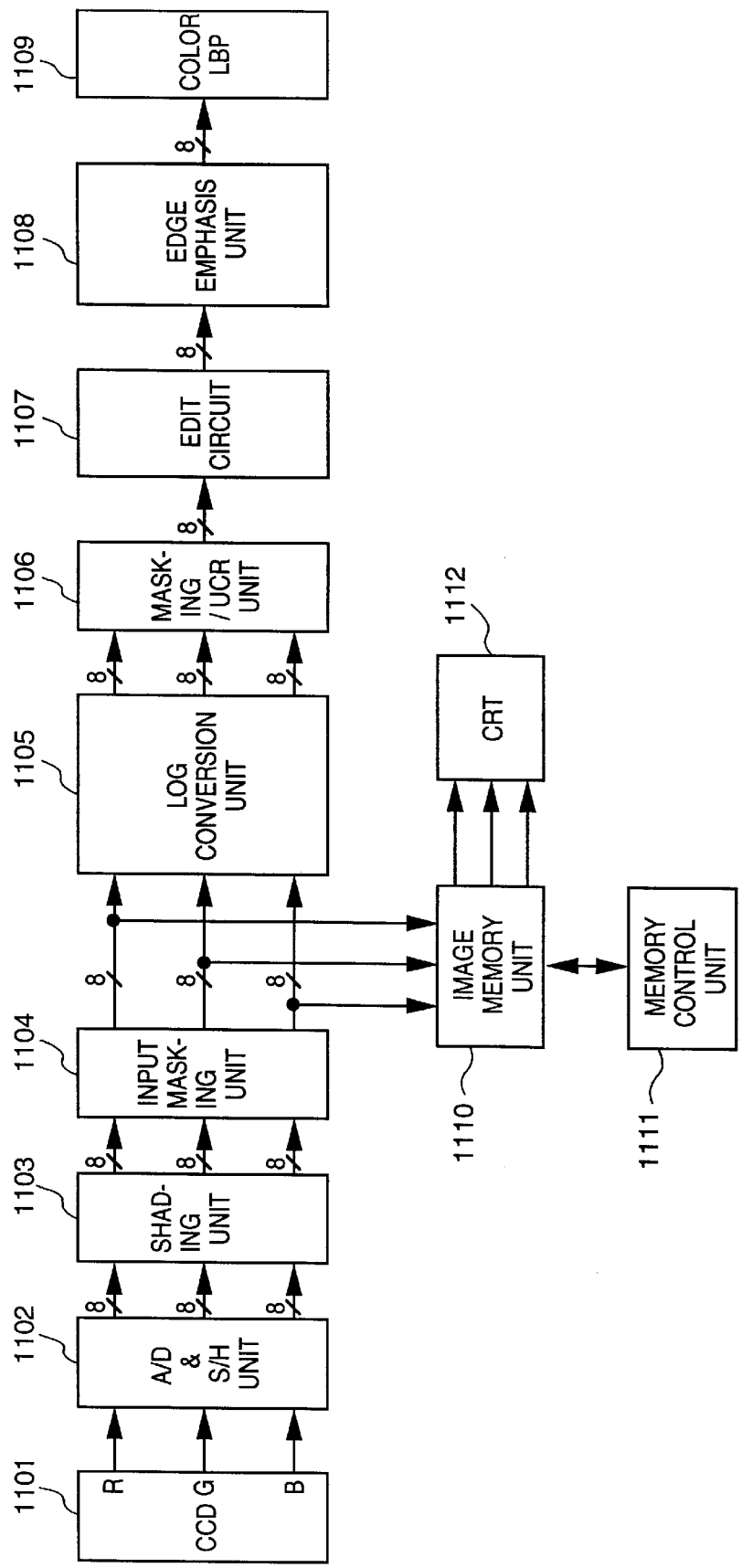
FIG. 1 is a block diagram showing an image processing apparatus having a preview function.

FIG. 1 is a block diagram showing the arrangement of an image processing apparatus having a preview function.

Referring to FIG. 1, reference numeral 1101 denotes a CCD sensor for reading a reflection original and outputting R, G, and B signals; 1102, a sample/hold (S/H) and analog/digital (A/D) converter (to be referred to as an "A/D & S/H unit" hereinafter); 1103, a shading unit; 1104, an input masking unit; 1105, a LOG conversion unit; 1106, a masking/UCR unit for adjusting colors to the printer characteristics; 1107, an edit circuit for performing various image edit operations such as trimming, masking, paint, zoom, and the like; 1108, an edge emphasis circuit; and 1109, a color laser beam printer (color LBP). These blocks constitute a full-color copying machine, which outputs a full color image by scanning an original image three or four times.

On the other hand, an image memory unit for storing R, G, and B image data after input masking processing, a memory control unit 1111 for controlling the image memory unit 1110, and a CRT 1112 for displaying an image stored in the image memory unit 1110 constitute a preview block.

In this arrangement, a read image is displayed in full color on the CRT 1112, but the edit result of the edit circuit 1107 is not reflected on the image displayed on the CRT 1112. Thus, a CPU (not shown) performs processing equivalent to the edit operations by the edit circuit 1107 with respect to image data stored in the image memory unit 1110, thus obtaining a preview image.

However, when all the image processing operations of the copying machine main body after the LOG conversion unit 1105 shown in FIG. 1 are performed for image data stored in the image memory unit 1110 in a software manner, the software program must have a huge size. Furthermore, when the edit circuit 1107 has a large number of complex functions, the calculation amount of the software program increases accordingly. In order to shorten the calculation time, a high-speed hardware arrangement must be adopted, resulting in an increase in cost.

An image processing apparatus according to an embodiment of the present invention will be described in detail below with reference to the accompanying drawings.

Figure 2:
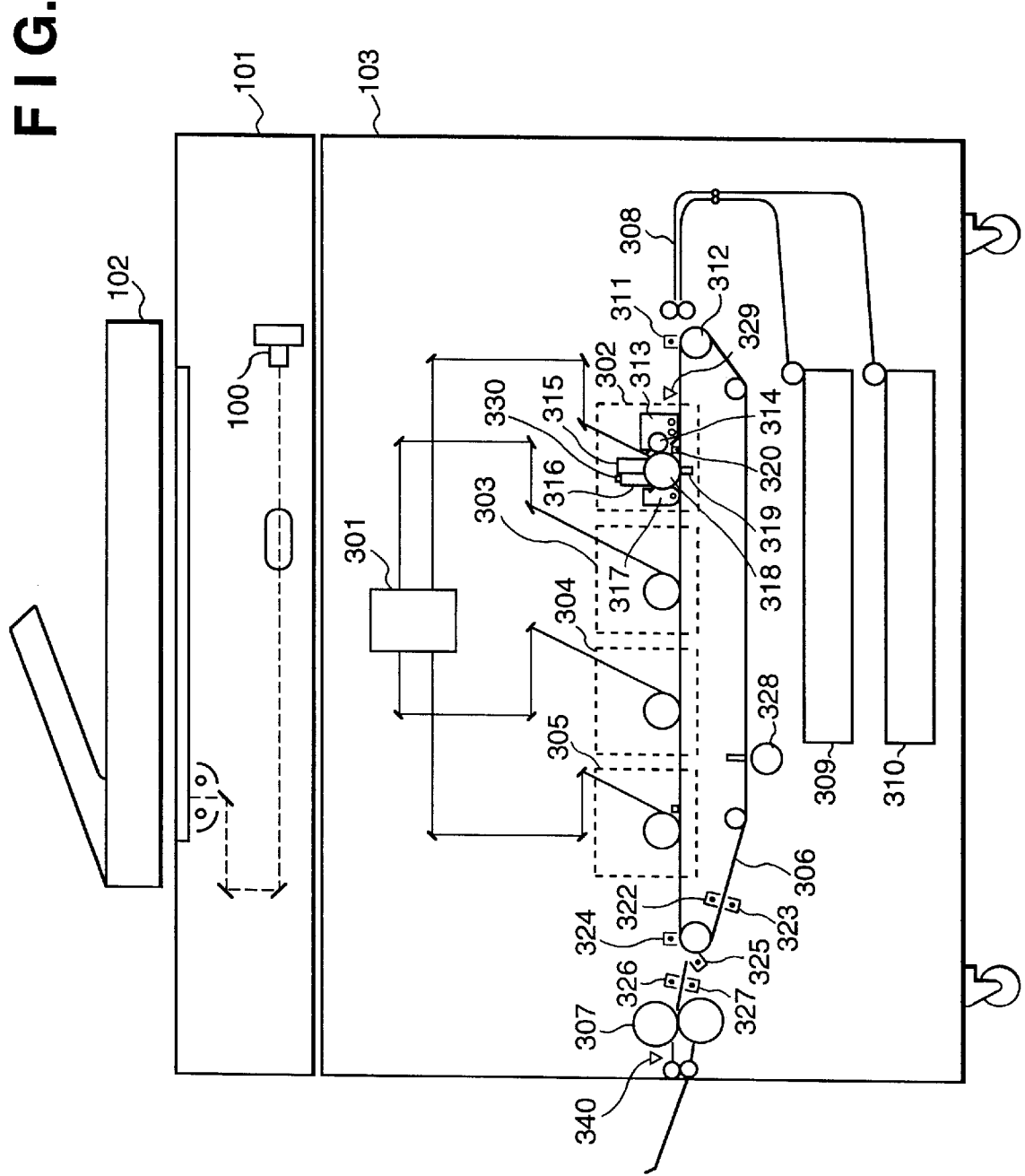
FIG. 2 is a schematic sectional view showing the arrangement of an image processing apparatus according to an embodiment of the present invention.

FIG. 2 is a schematic sectional view of a digital copying machine, which constitutes an image processing apparatus according to the embodiment of the present invention. The digital copying machine is roughly divided into two units. Reference numeral 101 denotes a reader unit for reading a color original image, and performing digital edit processing, and the like. Reference numeral 103 denotes a printer unit, which has different image carriers, and reproduces a color image in accordance with digital color image signals supplied from the reader unit 101. Note that an original feeder set on the reader unit 101 is a known option device for automatically feeding an original to an original reading area of the reader unit 101.

Although not shown in FIG. 2, a preview monitor such as a CRT, LCD, FLCD, or the like is connected to the copying machine via a predetermined interface.

[Arrangement of Printer Unit]

Figure 9:
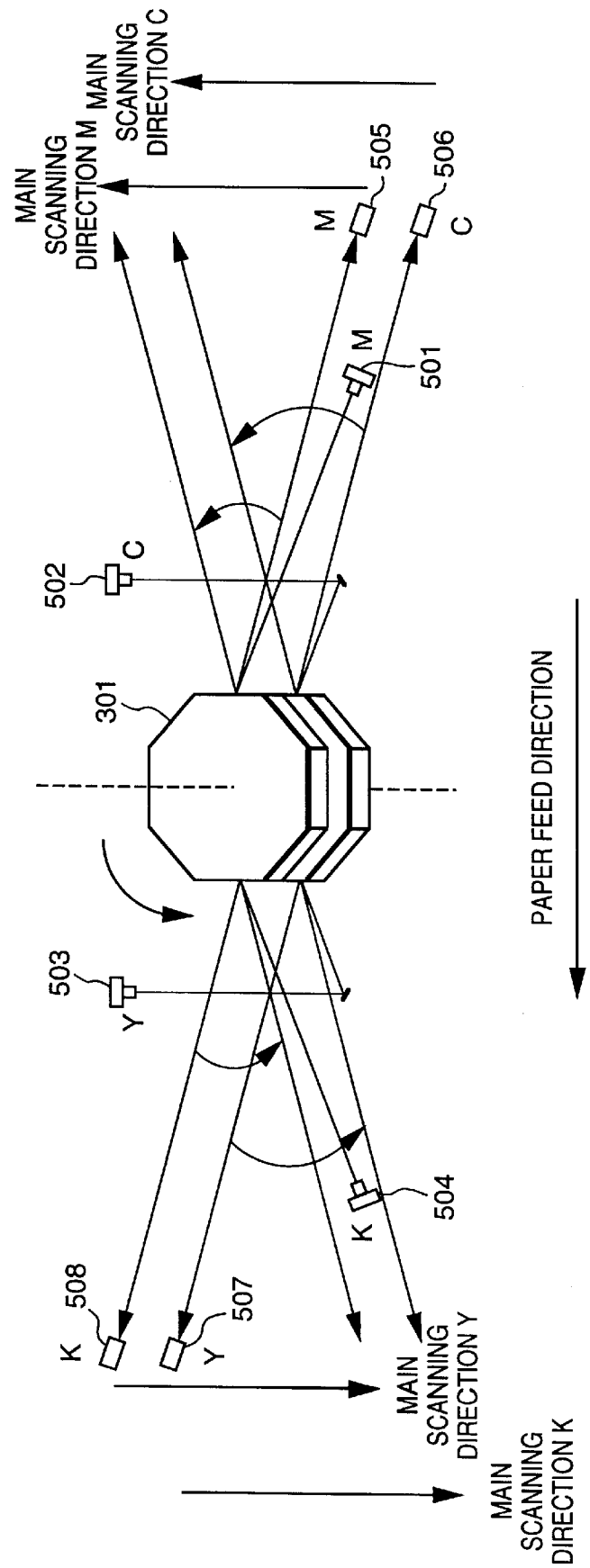
FIG. 9 is a view for explaining the scanning method of a laser beam.

Referring to FIG. 2, reference numeral 301 denotes a polygonal scanner which scans a laser beam output from a laser control unit (not shown) and exposes predetermined positions of photosensitive drums in image forming units 302 to 305 (to be described later). As shown in FIG. 9, the polygonal scanner 301 scans laser beams emitted by laser elements 501 to 504, which are independently driven in correspondence with M, C, Y, and K colors by the laser control unit, onto the photosensitive drums of the image forming units corresponding to the respective colors. Reference numerals 505 to 508 denote beam detection sensors (to be referred to as "BD sensors" hereinafter) for detecting the scanned laser beams and outputting signals BD used for generating main scanning synchronization signals. When two polygonal mirrors are coaxially arranged and are rotated by a single motor, as shown in FIG. 9, the M and C laser beams have the main scanning direction opposite to that of the Y and K laser beams. For this reason, Y and K image data are normally generated to be mirror images with respect to M and C images in the main scanning direction.

Reference numeral 302 denotes a magenta (M) image forming unit; 303, a cyan (C) image forming unit; 304, a yellow (Y) image forming unit; and 305, a black (K) image forming unit. These image forming units respectively form corresponding color images. Since the image forming units 302 to 305 have the same arrangement, the M image forming unit 302 will be described in detail below, and a description of other image forming units will be omitted.

In the M image forming unit 302, reference numeral 318 denotes a photosensitive drum, on the surface of which a latent image is formed by the laser beam scanned by the polygonal scanner 301. Reference numeral 315 denotes a primary charger for charging the surface of the photosensitive drum 318 to a predetermined potential to prepare for latent image formation. Reference numeral 313 denotes a developer for developing a latent image on the photosensitive drum 318 to form a toner image. Note that the developer 313 includes a sleeve 314 for performing development by applying a developing bias. Reference numeral 319 denotes a transfer charger for transferring the toner image on the photosensitive drum 318 onto a recording paper sheet or the like on a transfer belt 306 by performing a discharge operation from the back surface side of the transfer belt 306. After the transfer operation, the surface of the photosensitive drum 318 is cleaned by a cleaner 317 and is subjected to charge removal by an auxiliary charger 316, and the residual charge is erased therefrom by a pre-exposure lamp 330. Thus, the surface of the photosensitive drum 318 can be satisfactorily charged again by the primary charger 315.

A procedure for forming an image on a recording paper sheet or the like will be explained below. Reference numeral 308 denotes a paper feed unit for feeding a recording paper sheet stored in a cassette 309 or 310 to the transfer belt 306. A recording paper sheet fed from the paper feed unit 308 is charged by an attraction charger 311. Reference numeral 312 denotes a transfer belt roller for driving the transfer belt 306 and charging the recording paper sheet in combination with the attraction charger 311, so that the recording paper sheet is attracted onto the transfer belt 306. Reference numeral 329 denotes a paper leading end sensor for detecting the leading end of the recording paper sheet on the transfer belt 306. Note that the detection signal of the paper leading end sensor 329 is supplied from the printer unit 103 to the reader unit 101, and is used as a sub-scanning synchronization signal when the reader unit 101 supplies a video signal to the printer unit 103.

Thereafter, the recording paper sheet is conveyed by the transfer belt 306, and toner images are formed on the surface of the recording paper sheet in the order of M, C, Y, and K images by the image forming units 302 to 305. These M, C, Y and K images are formed at different positions (image forming positions) in the respective image forming units, to compensate for the spatial separation of the image forming units (differing positions of the image forming units with respect to the paper leading end sensor 329). The recording paper sheet which has passed the K image forming unit 305 is subjected to charge removal by a charge remover 324 so as to facilitate peeling from the transfer belt 306, and is then peeled from the transfer belt 306. Reference numeral 325 denotes a peeling charger for preventing an image disturbance caused by the peeling discharge operation upon peeling the recording paper sheet from the transfer belt 306. The recording paper sheet, which has been peeled from the transfer belt 306 is charged by pre-fixing chargers 326 and 327 to compensate for the toner attraction force and to prevent an image disturbance, and is then supplied to a fixing device 307 to thermally fix the toner images on its surface. Thereafter, the recording paper sheet is exhausted. Reference numeral 340 denotes a paper exhaust sensor for detecting the exhausted recording paper sheet.

[Arrangement of Reader Unit]

Figure 3:
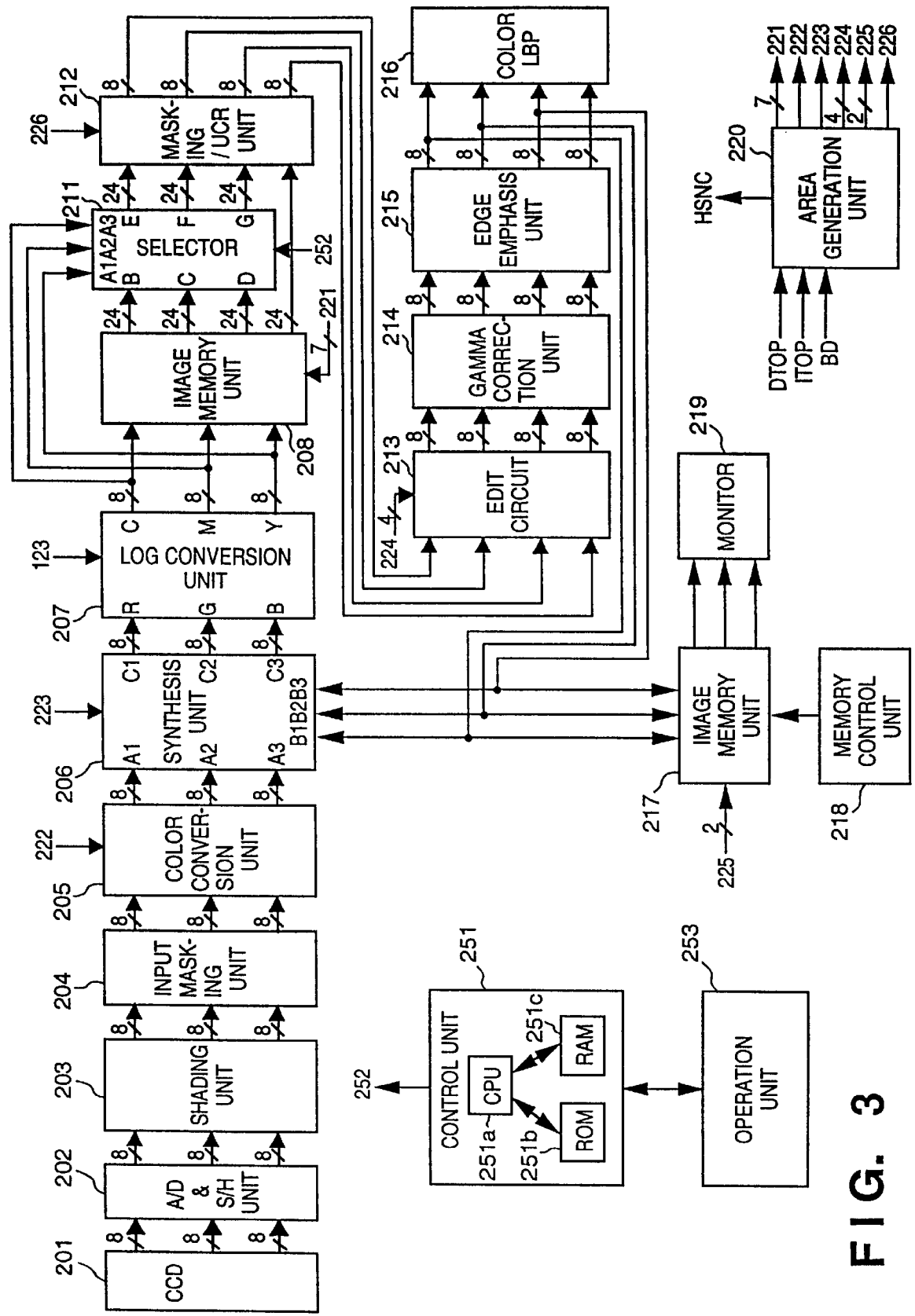
FIG. 3 is a block diagram showing the arrangement of a digital image processing unit in a reader unit shown in FIG. 2.

FIG. 3 is a block diagram showing the arrangement of a digital image processing unit in the reader unit 101.

Reference numeral 251 denotes a control unit, which is constituted by a CPU 251*a*, a ROM 251*b* which pre-stores programs and various data, a RAM 251c which is used as a work memory of the CPU 251a, an I/O, and the like. The control unit 251 controls the following components in accordance with the programs stored in the ROM 251b to execute a copying operation and a preview operation. Reference numeral 253 denotes an operation unit which is constituted by a display unit such as an LCD for displaying the operation state and operation condition of the apparatus by the control unit 251, and a keyboard, a touch panel, and the like used for inputting an operator's instruction.

A color original placed on an original table glass reflects light emitted by a halogen lamp, and the reflected light is guided to a 3-line sensor 100 to be converted into electrical signals. The electrical signals (analog image signals) output from a CCD 201 constituting the 3-line sensor 100 are sampled and held, and A/D-converted into R, G, and B 8-bit digital signals by an A/D & S/H unit 202. The R, G, and B signals are subjected to shading correction and black correction in a shading unit 203, and the corrected signals are then converted into NTSC signals by an input masking unit 204. Thereafter, the NTSC signals are color-converted by a color conversion unit 205.

Reference numeral 206 denotes a synthesis unit for performing a synthesis operation of image data input from the color conversion unit 205 and output data stored in an image memory unit 208, and the like, and inputting the synthesized result to a LOG conversion unit 207. C, M, and Y image data output from the LOG conversion unit 207 are supplied to the image memory unit-208 and a selector 211.

The image memory unit 208 stores the input C, M, and Y data (24 bits) before output masking processing, and outputs four sets of C, M and Y data for the original image. These sets of data differ from each other in correspondence with the differing image forming positions of the respective image forming units 302, 303, 304 and 305, which in turn is a consequence of the differing positions of those units in the printer unit 103. On the other hand, the selector,211 receives three sets of C, M, and Y data output from the image memory unit 208 at its terminals B to D and also receives C, M, and Y data output from the LOG conversion unit 207 at its terminals A1 to A3, and selects and outputs input signals in correspondence with an edit mode. More specifically, when a selection signal 252 supplied from the control unit 251 is "L", the selector 211 selects input data at the terminals A1 to A3, and outputs them from terminals E, F, and G. On the other hand, when the selection signal 252 is "H", the selector 211 selects input data at the terminals B, C, and D, and outputs them from the terminals E, F, and G.

A masking/UCR unit 212 receives the three sets of C, M, and Y data output from the selector 211, and also receives a set of C, M, and Y data output from the image memory unit 208 without going through the selector 211. Then, the masking/UCR unit 212 performs masking processing and UCR processing of the input data to generate C, M, Y, and K data matching the printer characteristics. Note that the read-out processing from the image memory unit 208 and the processing of the masking/UCR unit 212 are performed in four systems in correspondence with C, M, Y, and K colors so as to generate C, M, Y, and K data corresponding to the image forming position differences in the four image forming units.

Since data input to the terminals A1 to A3 of the selector 211 are a set of C, M, and Y data, when the selector 211 selects input data at the terminals A1 to A3, the C, M, and Y data are assigned to the upper 8 bits of corresponding 24-bit data, and these 24-bit data are input to the masking/UCR unit 212.

The C, M, and Y data selected by the selector 211 are subjected to UCR processing and masking processing in the masking/UCR unit 212 to generate black (K) data and to be converted into color data matching the printer characteristics. The converted data are subjected to full-color processing and paint processing in an edit circuit 213, are subjected to gamma correction corresponding to the printer characteristics in a gamma correction unit 214, and are then subjected to edge emphasis in an edge emphasis unit 215. Thereafter, the processed data are supplied to a color LBP 216 (the printer unit 103 shown in FIG. 2), thus forming an image on a recording paper sheet.

Reference numeral 217 denotes an image memory unit for storing edited image data output from the edge emphasis unit 215; 218, a memory control unit for controlling the image memory unit 217; and 219, a monitor for displaying an image stored in the image memory unit 217.

Reference numeral 220 denotes an area generation unit for generating a main scanning synchronization signal HSNC and the following signals on the basis of signals BD, DTOP, and ITOP generated inside the color LBP 216. A signal 221 is a signal for controlling the image memory unit 208, and consists of a total of 7 bits, i.e., a 2-bit write enable signal (a 1-bit main scanning signal and a 1-bit sub-scanning signal), and a 5-bit read enable signal (a 1-bit main scanning signal and a 4-bit sub-scanning signal). A signal 222 is an enable signal (area signal) for the color conversion unit 205, a signal 223 is an enable signal for the synthesis unit 206, a signal 224 is an enable signal (4 bits) for the edit circuit 213, and a signal 225 is an enable signal (a 1-bit main scanning signal and a 1-bit sub-scanning signal) for the image memory unit 217. A signal 226 is a switching signal of the masking/UCR unit 212, which is used for selecting whether normal masking/UCR processing is executed or an ND signal is output. The control unit 251 switches the signal 226 to output an ND signal in an area designated with a free color mode in the edit processing.

Although not shown, in this embodiment, image data can be input from an external computer or the like to the color conversion unit 205 or the image memory unit 208 via a predetermined interface, and the externally input image data can be processed in the same manner as image data obtained by reading an original.

[Flow of Image Signal]

The flows of image signals in the respective image modes will be described below.

Normal Copy

In the normal copy mode, the selector 211 selects input data at the terminals B, C, and D to generate C, M, Y, and K data according to the printer characteristics using four sets of C, M, and Y data supplied from the image memory unit 208 and corresponding to the position differences in the image forming units, and edit processing is performed for each color component data. That is, the flow of image data is as follows.

CCD 201→ . . . →synthesis unit 206→LOG conversion unit 207→image memory unit 208→selector 211→masking/UCR unit 212→ . . . →color LBP 216

Preview Mode (1) To display edit processing (color conversion) result of RGB system on monitor:

CCD 201→ . . . →synthesis unit 206→ . . . →color LBP 216

(2) To display edit processing (paint or free color) result of CMY system on monitor:

In this case, the control unit 251 sets processing parameters for directly outputting input data in the masking/UCR unit 212, and sets an inverse LOG table for converting C, Y, and Y image data into R, G, and B image data in the gamma correction unit 214. That is, inverse processing of the LOG conversion unit 207 is performed for image data.

CCD 201→ . . . →synthesis unit 206→selector 211→masking/UCR unit 212→ . . . →edge emphasis unit 215→image memory unit 217→monitor 219

When the edit processing of the RGB system and the edit processing of the CMY system are performed, no image synthesis is performed, and since data need not be synchronized with the image synthesis, the selector 211 selects input data at the terminals A1 to A3, thereby displaying a preview image on the monitor 219 without going through the image memory unit 208.

As described above, since the output signal lines immediately before the color LBP 216 are branched and connected to the preview processing unit, the edit processing result of the CMY system such as paint processing, free color processing, and the like can be satisfactorily confirmed on the monitor 219 with a simple arrangement using the edit circuit of the digital copying machine.

In addition, since the four systems of image data read out from the image memory unit 208 are controlled using the control signal 221 in correspondence with the normal mode (copy mode) and the preview mode, image data can be efficiently read out in the preview mode.

(3) To display synthesis result on monitor:
<First step> Store first image

CCD 201→ . . . synthesis unit 206→LOG conversion unit 207→image memory unit 208

<Second step> Synthesize first and second images

In this case, the control unit 251 sets processing parameters for directly outputting input data in the masking/UCR unit 212, and sets the inverse LOG table for converting C, Y, and Y image data into R, G, and B image data in the gamma correction unit 214.

(first image) image memory unit 208→selector 211→masking/UCR unit 212→ . . . →edge emphasis unit 215→synthesis unit 206

(second image) CCD 201→ . . . →synthesis unit 206

<Third step> Store synthesized image and display stored image on monitor

In this case, the control unit 251 sets processing parameters for directly outputting input data in the masking/UCR unit 212, and sets the inverse LOG table for converting C, Y, and Y image data into R, G, and B image data in the gamma correction unit 214.

synthesis unit 206→LOG conversion unit 207→image memory unit 208 (store) image memory unit 208→selector 211→masking/UCR unit 212→ . . . →edge emphasis unit 215→image memory unit 217→monitor 219

As described above, when the synthesis result is displayed on the monitor 219, the synthesized image is temporarily stored in the image memory unit 208. In order to display the synthesis result on the monitor 219, the image data is read out from the image memory unit 208.

In the normal copy mode, as described above, four sets of C, M, and Y data are independently read out from the image memory unit 208 in correspondence with the image forming position differences. However, when an image is to be displayed on the monitor, three sets of C, M, and Y data indicating an identical position of an image are read out from the image memory unit 208 on the basis of the fact that the monitor 219 simultaneously uses a plurality of color components indicating one pixel. Furthermore, when an image is to be displayed on the monitor, three sets of C, M, and Y data are read out from the image memory unit 208 so as to store R, G, and B data indicating the synthesis result in the image memory unit 217.

Note that the read-out control of the image memory unit 208 is realized by changing the contents of the 5-bit read enable signal (a 1-bit main scanning signal and a 4-bit sub-scanning signal) in the signal 221 generated by the area generation unit 220 between the normal copy mode and the monitor display mode.

More specifically, in the normal copy mode, a 5-bit read enable signal including a 4-bit sub-scanning signal used in control for reading out four sets of C, M, and Y data in correspondence with the image forming position differences in the image forming units corresponding to C, M, Y, and K colors is generated. On the other hand, in the monitor display mode, a 5-bit read enable signal including a 4-bit sub-scanning signal used in control for reading out three sets of C, M, and Y data indicating an identical image is generated. Since no K component is generated in the monitor display mode, C, M, and Y data need not be read out in correspondence with the K component.

As described above, since this embodiment uses the flows of image signals matching the respective image modes, the throughput can be improved.

More specifically, when image data are stored in the image memory unit 208, the area generation unit 220 and the control unit 251 are heavily loaded and the storage time and read-out time are required. Therefore, like in the image synthesis processing of this embodiment, i.e., in processing other than that requires the storage processing of image data, the image data are processed without going through the image memory unit 208, thereby improving processing efficiency.

With a simple arrangement for changing the contents of the read enable signal between the monitor display mode and the normal copy mode, the read-out control of the image memory unit 208 can be modified to be suitable for each processing.

Furthermore, since the position differences among the respective sets of C, M, and Y data generated in the normal copy mode can be absorbed in the monitor display mode without requiring any memory such as a FIFO (First In First Out), the circuit scale can be reduced.

[Processing Sequence]

Figure 4:
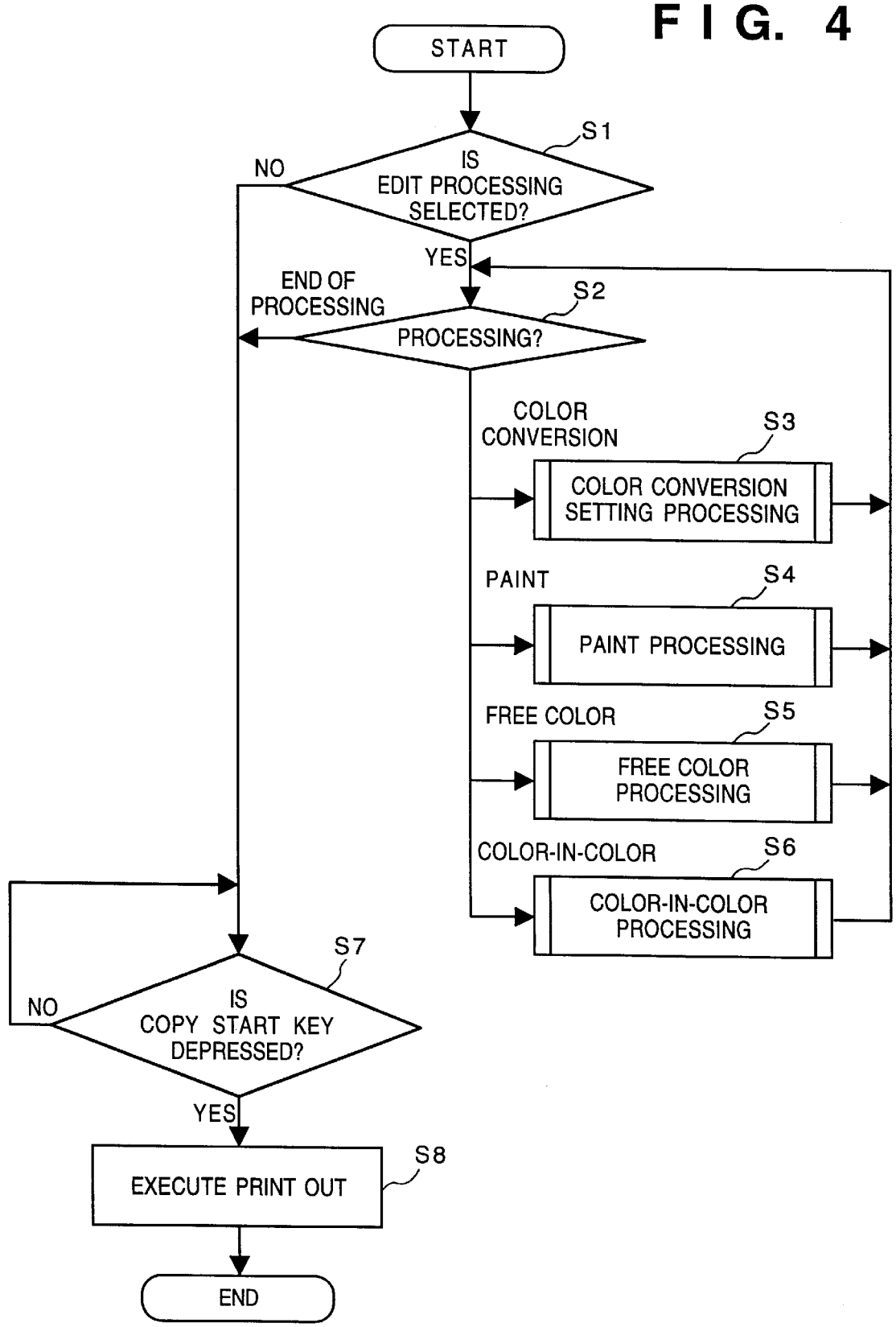
FIG. 4 is a flow chart showing the processing sequence from edit processing to print-out processing.

FIG. 4 is a flow chart showing the processing sequence from edit processing to print-out processing, and this sequence is executed by the control unit 251 which receives a processing start instruction input from the operation unit 253 by an operator.

In step S1, it is checked if edit processing is selected. If YES in step S1, it is checked in step S2 which edit processing is to be executed. If the edit processing to be executed is color conversion setting processing, the flow advances to step S3; if it is paint processing, the flow advances to step S4; if it is free color processing, the flow advances to step S5; or if it is color-in-color processing, the flow advances to step S6. Upon completion of the selected processing, the flow returns to step S2. On the other hand, if edit processing is not selected in step S1, or if the end of processing is selected in step S2, the flow advances to step S7. As will be described in detail later, in the processing in each of steps S3 to S6, the operator sets processing parameters. In this case, when the operator uses the preview function of this embodiment, he or she can adjust the processing parameters to obtain a desired image.

In step S7, the control waits for depression of a copy start key on the operation unit 253. When the key is depressed, print-out processing is executed in step S8.

Color Conversion Setting Processing

Figure 5:
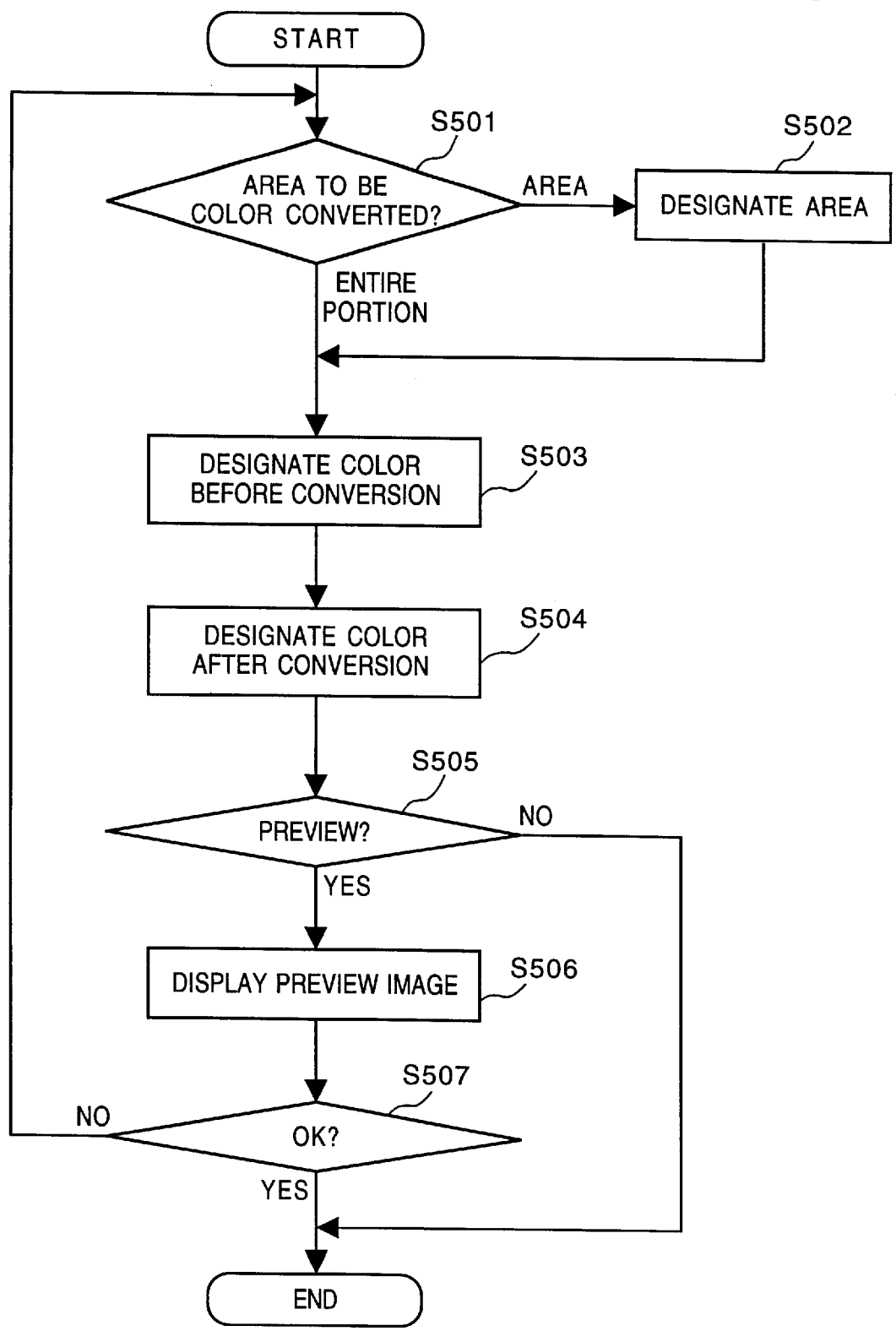
FIG. 5 is a flow chart showing in detail the color conversion setting processing.

FIG. 5 is a flow chart showing in detail the color conversion setting processing.

In step S501, an area (the entire portion or a predetermined area of an image) to be subjected to color conversion is selected. When a predetermined area is selected, the area is designated by, e.g., a digitizer (not shown) in step S502.

A color before conversion is designated in step S503, and a color after conversion is designated in step S504. The control unit 251 sets processing parameters for executing the designated processing in the color conversion unit 205. Since all the processing parameters required for color conversion are set at that time, the operator can instruct execution of the preview operation by depressing a preview key on the operation unit 253. That is, if it is determined in step S505 that a preview operation is instructed, an original image is read, and a preview image is displayed on the monitor 219 in accordance with the flow of image signals described above in the paragraphs "To display edit processing (color conversion) result of RGB system on monitor", in step S506. If the preview operation is not instructed, this processing ends, and the flow returns to the processing shown in FIG. 4.

When the operator can obtain his or her desired color conversion result upon observation of the preview image, he or she depresses an OK key on the operation unit 253 to instruct the end of processing. That is, if it is determined in step S507 that the end of processing is instructed, the processing ends, and the flow returns to the processing shown in FIG. 4. On the other hand, when the operator cannot obtain his or her desired result or sets color conversion of another area, he or she operates the operation unit 253 and the like, and the flow returns to one of steps S501 to S504.

Paint Processing

Figure 6:
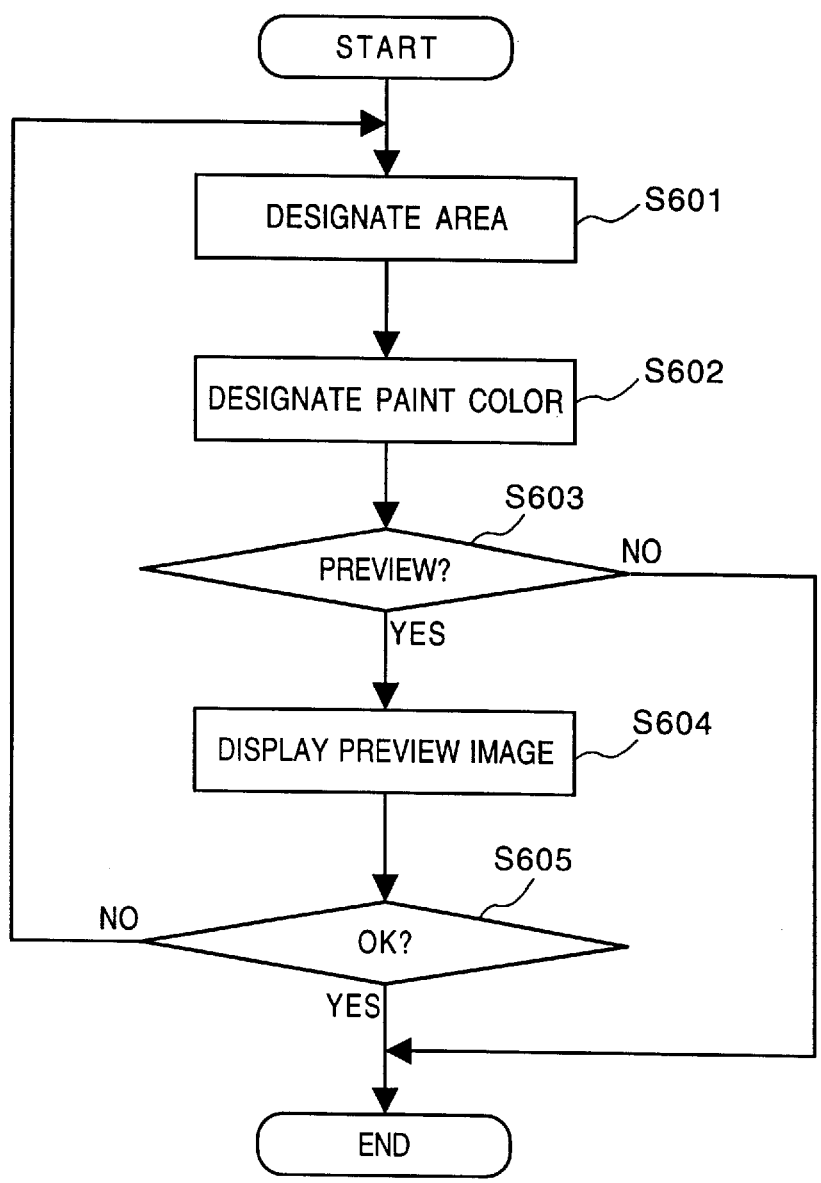
FIG. 6 is a flow chart showing in detail the paint processing.

FIG. 6 is a flow chart showing in detail the paint processing.

An area is designated using a digitizer (not shown) in step S601, and a paint color is designated in step S602. The control unit 251 sets processing parameters for executing the designated processing in the edit circuit 213. Since all the processing parameters required for the paint processing are set at that time, the operator can instruct execution of the preview operation by depressing the preview key on the operation unit 253. That is, if it is determined in step S603 that a preview operation is instructed, an original image is read, and a preview image is displayed on the monitor 219 in accordance with the flow of image signals described above in the paragraphs "To display edit processing (paint or free color) result of CMY system on monitor", in step S604. On the other hand, if the preview operation is not instructed, this processing ends, and the flow returns to the processing shown in FIG. 4.

When the operator can obtain his or her desired paint result upon observation of the preview image, he or she depresses the OK key on the operation unit 253 to instruct the end of processing. That is, if it is determined in step S605 that the end of processing is instructed, the processing ends, and the flow returns to the processing shown in FIG. 4. On the other hand, when the operator cannot obtain his or her desired result or wants to process another area, he or she operates the operation unit 253 and the like, and the flow returns to step S601 or S602.

Free Color Processing

Figure 7:
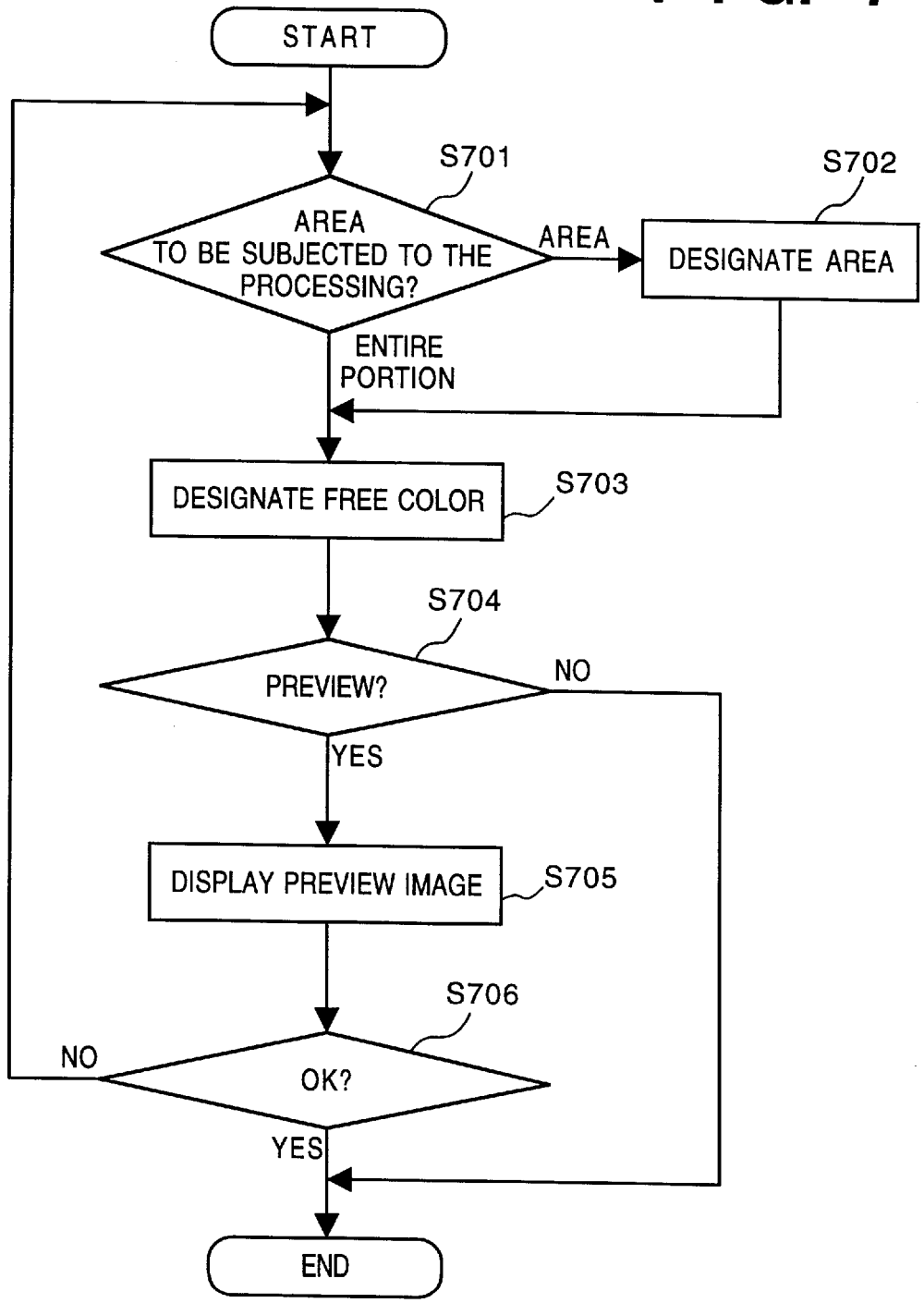
FIG. 7 is a flow chart showing in detail the free color processing.

FIG. 7 is a flow chart showing in detail the free color processing.

In step S701, an area (the entire portion or a predetermined area of an image) to be subjected to the processing is selected. When a predetermined area is selected, the area is designated by, e.g., a digitizer (not shown) in step S702.

In step S703, a free color is designated, and the control unit 251 sets processing parameters for executing the designated processing in the edit circuit 213. Since all the processing parameters required for the free color processing are set at that time, the operator can instruct execution of the preview operation by depressing the preview key on the operation unit 253. That is, if it is determined in step S704 that a preview operation is instructed, an original image is read, and a preview image is displayed on the monitor 219 in accordance with the flow of image signals described above in the paragraphs "To display edit processing (paint or free color) result of CMY system on monitor", in step S705. On the other hand, if the preview operation is not instructed, this processing ends, and the flow returns to the processing shown in FIG. 4.

When the operator can obtain his or her desired free color processing result upon observation of the preview image, he or she depresses the OK key on the operation unit 253 to instruct the end of processing. That is, if it is determined in step S706 that the end of processing is instructed, the processing ends, and the flow returns to the processing shown in FIG. 4. On the other hand, when the operator cannot obtain his or her desired result or wants to process another area, he or she operates the operation unit 253 and the like, and the flow returns to one of steps S701 to S703.

Color-in-color (Memory Synthesis) Processing

Figure 8:
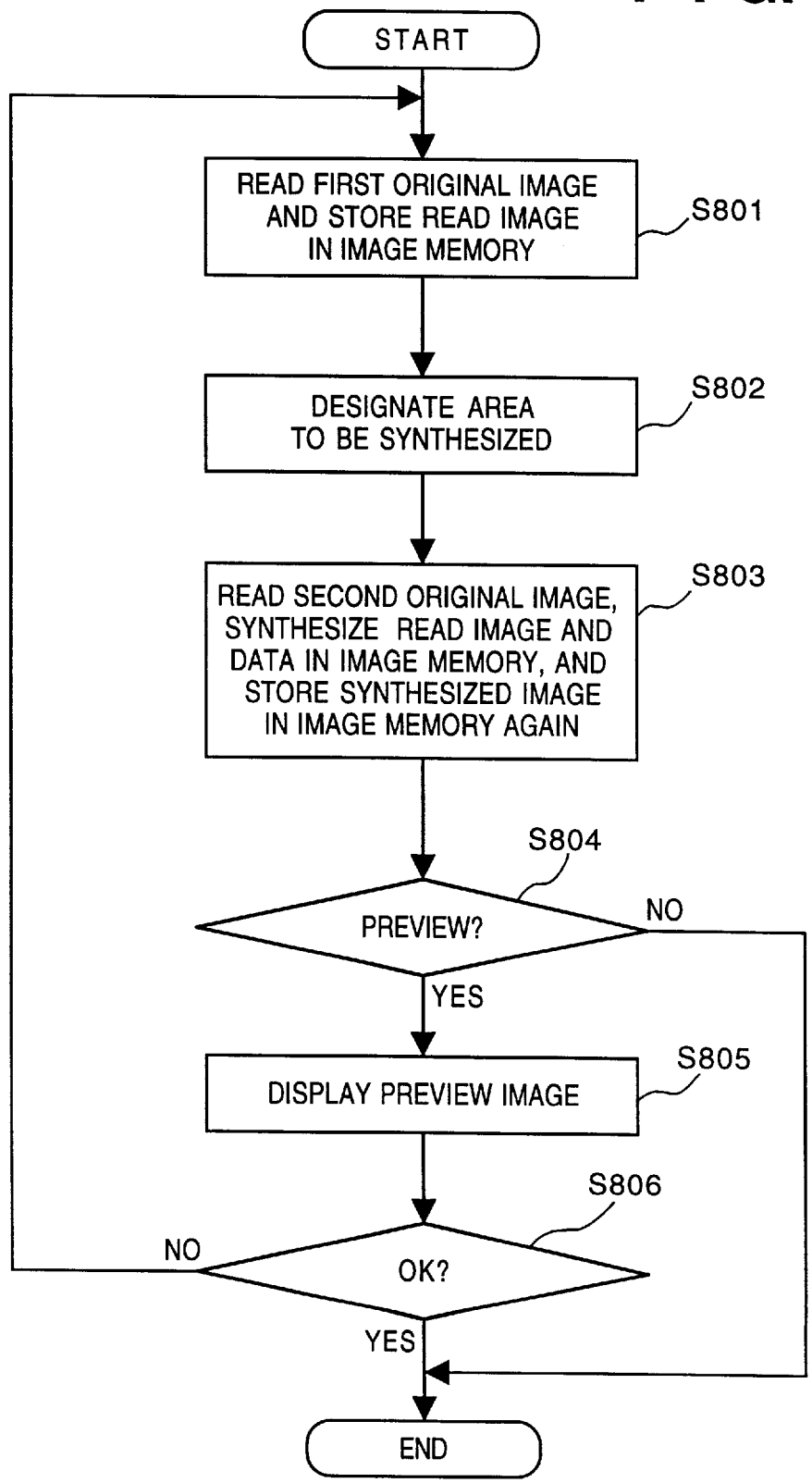
FIG. 8 is a flow chart showing in detail the memory synthesis processing.

FIG. 8 is a flow chart showing in detail the memory synthesis processing.

In step S801, image data obtained by reading the first original image are stored in the image memory unit 208. In step S802, an area where the second original image is to be synthesized is designated using a digitizer (not shown). In step S803, the image data stored in the image memory unit 208 and image data obtained by reading the second original image are synthesized on the basis of the designated area information using a read modify write method (to be described later) in the synthesis unit 206, and the synthesized image data are stored in the image memory unit 208.

If it is determined in step S804 that a preview operation is instructed, a preview image is displayed on the monitor 219 in accordance with the flow of image signals described above in the paragraphs "To display synthesis result on monitor" in step S805. On the other hand, if the preview operation is not instructed, this processing ends, and the flow returns to the processing shown in FIG. 4.

When the operator can obtain his or her desired synthesis result upon observation of the preview image, he or she depresses the OK key on the operation unit 253 to instruct the end of processing. That is, if it is determined in step S806 that the end of processing is instructed, the processing ends, and the flow returns to the processing shown in FIG. 4. On the other hand, when the operator cannot obtain his or her desired result or wants to synthesize an image on another area, he or she operates the operation unit 253 and the like, and the flow returns to one of steps S801 to S803.

[Image Memory Unit 217]

Figure 10:
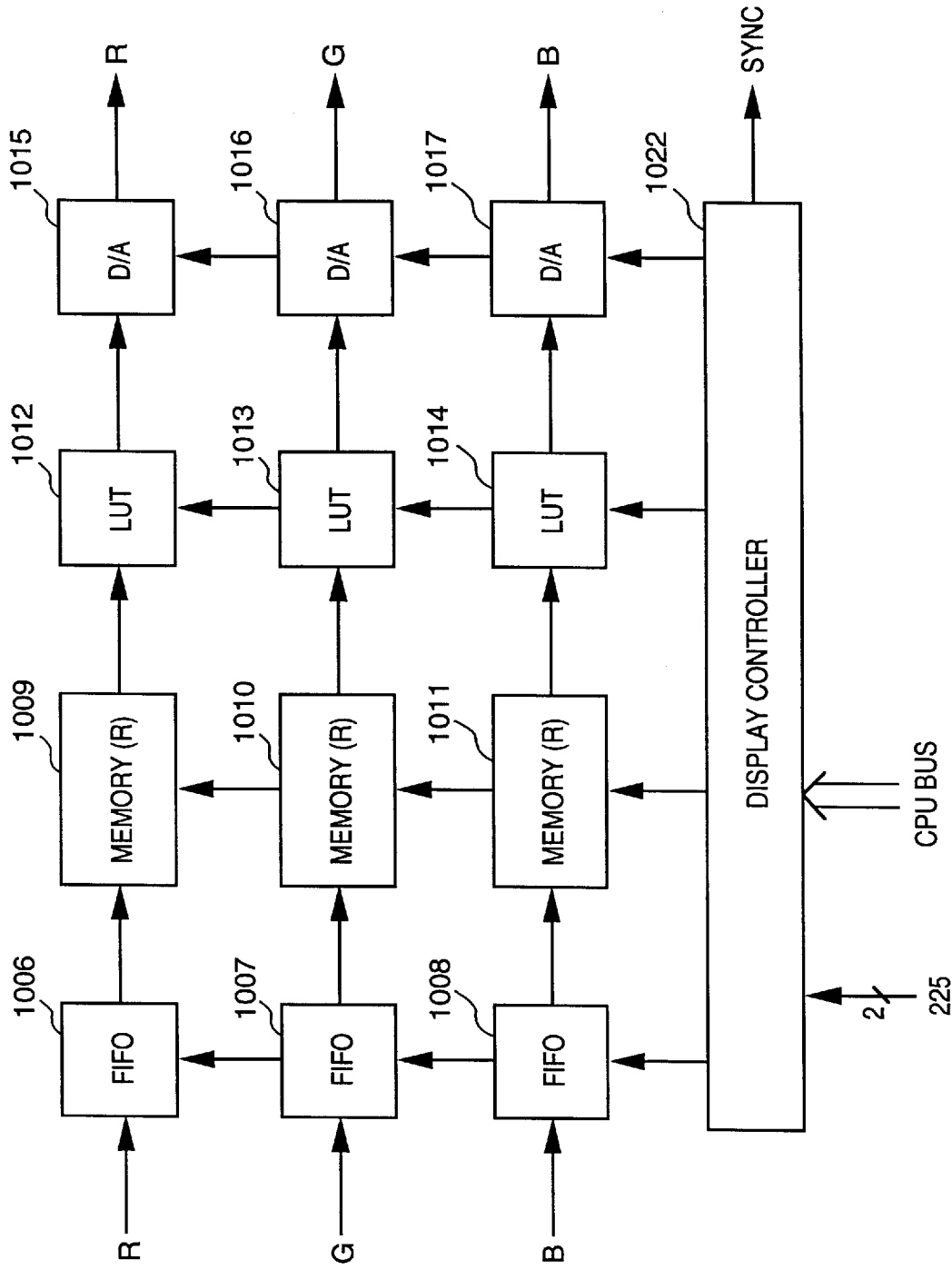
FIG. 10 is a block diagram showing the arrangement of an image memory unit 217 shown in FIG. 3.

FIG. 10 is a block diagram showing the arrangement of the image memory unit 217.

R, G, and B image data output from the edge emphasis unit 215 are respectively input to FIFOs 1006 to 1008. The FIFOs 1006 to 1008 are used for converting the transfer speed of image data supplied at high speed from the apparatus main body into that suitable for writing data in display memories 1009 to 1011 under the control of a display controller 1022. Note that the display controller 1022 controls the image memory unit 217 on the basis of the instruction from the control unit 251 and the signal 225 (a main scanning enable signal and a sub-scanning enable signal) supplied from the area generation unit 220.

The memories 1009 to 1011 comprise video RAMs, and read and write accesses to image data in these RAMs are controlled by the display controller 1022. When image data are written in the memories 1009 to 1011, the display controller 1022 enlarges or reduces the image size to be equal to the display area size of the monitor 219. Since the memories 1009 to 1011 have a size larger than a memory size required for the display area of the monitor 219, the control unit 251 can read out image data from an arbitrary position of the memory or can read out image data while enlarging or reducing the image size, by controlling the display controller 1022 via a CPU bus.

Look-up tables (LUTs) 1012 to 1014 comprise RAMs for correcting the gamma characteristics and the like of image data read out from the memories 1009 to 1011 to be suitable for those of the monitor 219. Note that the control unit 251 can set arbitrary correction characteristics in the LUTs 1012 to 1014 by controlling the display controller 1022 via the CPU bus.

D/A (digital-to-analog) converters 1015 to 1017 convert image data output from the LUTs 1012 to 1014 into video signals to be supplied to the monitor 219. Analog R, G, and B signals output from the D/A converters 1015 to 1017 are supplied to the monitor 219 together with a synchronization signal SYNC output from the display controller 1022, and an image is displayed on the monitor 219.

[Color Conversion Unit]

Figure 11:
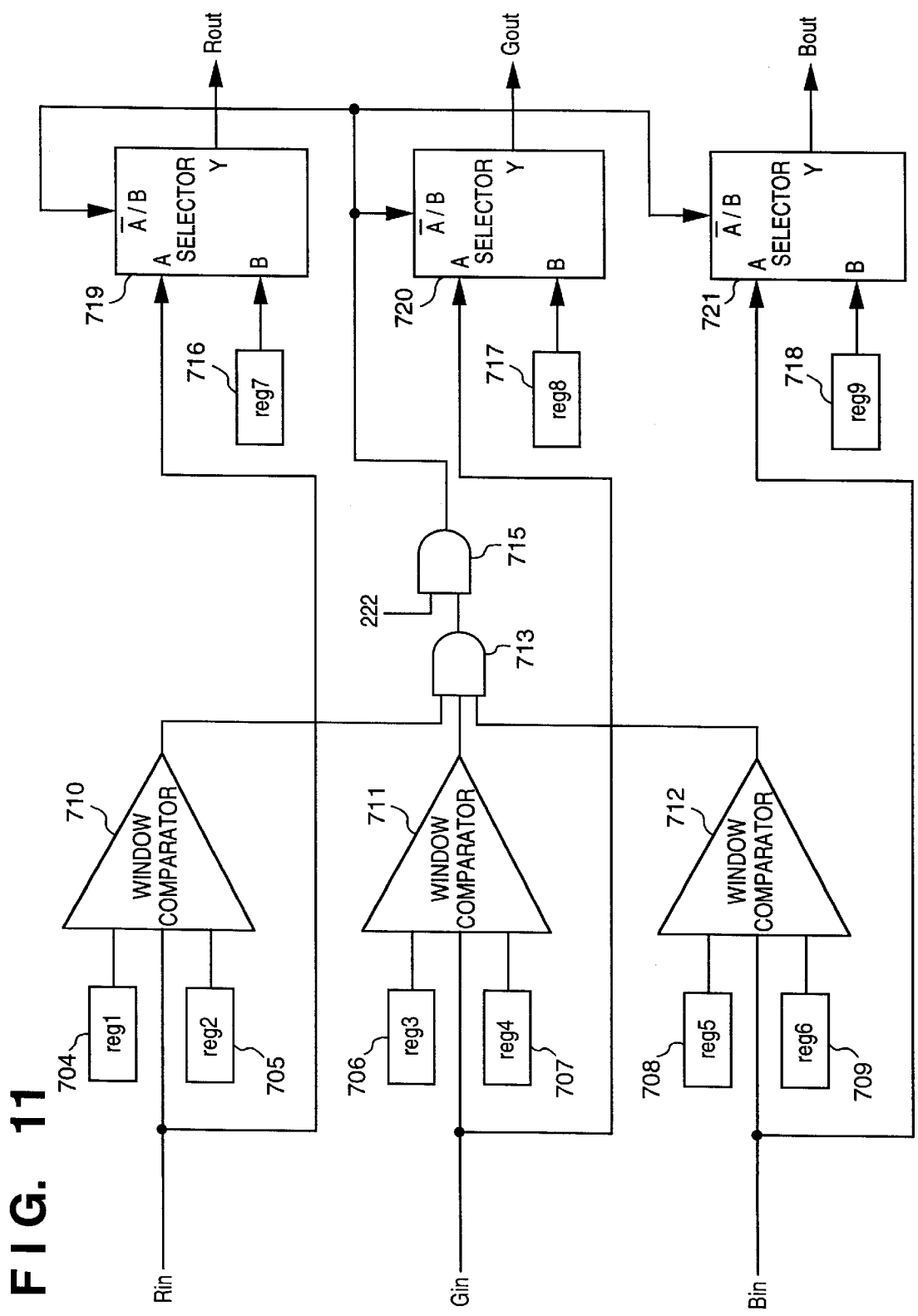
FIG. 11 is a block diagram showing the arrangement of a color conversion unit shown in FIG. 3.

FIG. 11 is a block diagram showing the arrangement of the color conversion unit 205. The color conversion unit 205 is divided into a detection section and a conversion section.

The detection section includes three window comparators 710 to 712, two AND gates 713 and 715, and registers 704 to 709 for storing the threshold values of the window comparators. Note that the threshold values of the window comparators are set by the control unit 251. When input image data satisfy all the conditions below, since the outputs from the window comparators and the AND gate 713 change to "1", a specific characteristic color is detected when the area signal 222 input from the area generation unit 220 to the AND gate 715 is "1".

reg1≦Rin≦reg2
reg3≦Gin≦reg4
reg5≦Bin≦reg6 where Rin, Gin, Bin:R, G, and B signals input to color conversion unit 205 reg1 to reg6:threshold values stored in registers 704 to 709

On the other hand, the conversion section includes three selectors 719 to 721 and three registers 716 to 718. When the output from the AND gate 715 is "1", the conversion section outputs conversion colors set in the registers 716 to 718 by the control unit 251; when the output from the AND gate 715 is "0", the conversion section outputs image signals input to the color conversion unit 205.

[Paint & Free Color Processing]

Figure 12:
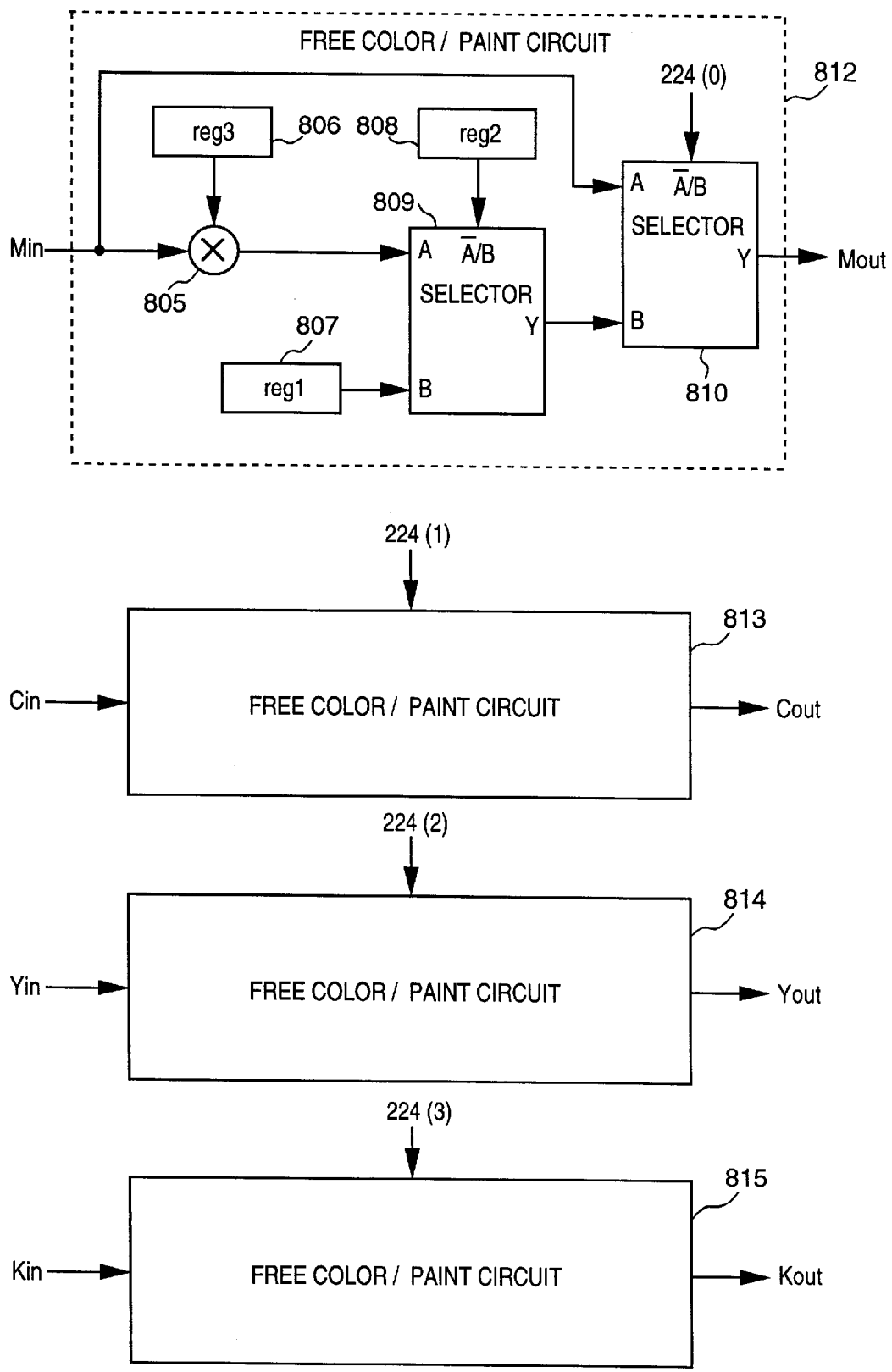
FIG. 12 is a block diagram showing the arrangement of an edit circuit shown in FIG. 3.

FIG. 12 is a block diagram showing the arrangement of the edit circuit 213. Since the circuit 231 comprises identical arrangements in correspondence with the respective color components, only the arrangement of a free color/paint circuit 812 for a magenta signal Min will be described below, and a detailed description of the arrangements of free color/paint circuits for other color components will be omitted.

The free color/paint circuit 812 includes a multiplier 805, two selectors 809 and 810, and registers 806 to 808, the values of which are set by the control unit 251.

In the operation of the free color processing, the ND signal (=M/3+C/3+Y/3) generated by the masking/UCR unit 212 is multiplied with a value reg3 (determined by a color set by the user) set in the register 806 by the multiplier 805, and the product output from the multiplier 805 is selected by the selector 809 in accordance with a value reg2 set in the register 808. At this time, since bit 0 of the enable signal 224 is set to be "1", the selector 810 selects and outputs the output from the selector 809. When the free color processing is performed for only a portion of an image, bit 0 of the signal 224 can be set to be "1" in correspondence with only the area to be processed. At this time, the masking/UCR unit 212 is controlled to output an ND signal for only the area to be subjected to the free color processing.

In the paint processing, the selector 809 is controlled to select a value reg1 set in the register 807 in accordance with the value reg2 set in the register 808, and the selector 810 is controlled to select the output from the selector 809 in correspondence with only an area where bit 0 of the signal 224 is "1".

Note that cyan, yellow, and black free color/paint circuits 813, 814, and 815 are respectively controlled by bits 1, 2, and 3 of the area signal 224. On the other hand, in the preview display mode, the control is made to simultaneously enable all the bits of the signal 224.

[Memory Synthesis and Memory Control]

Figure 13:
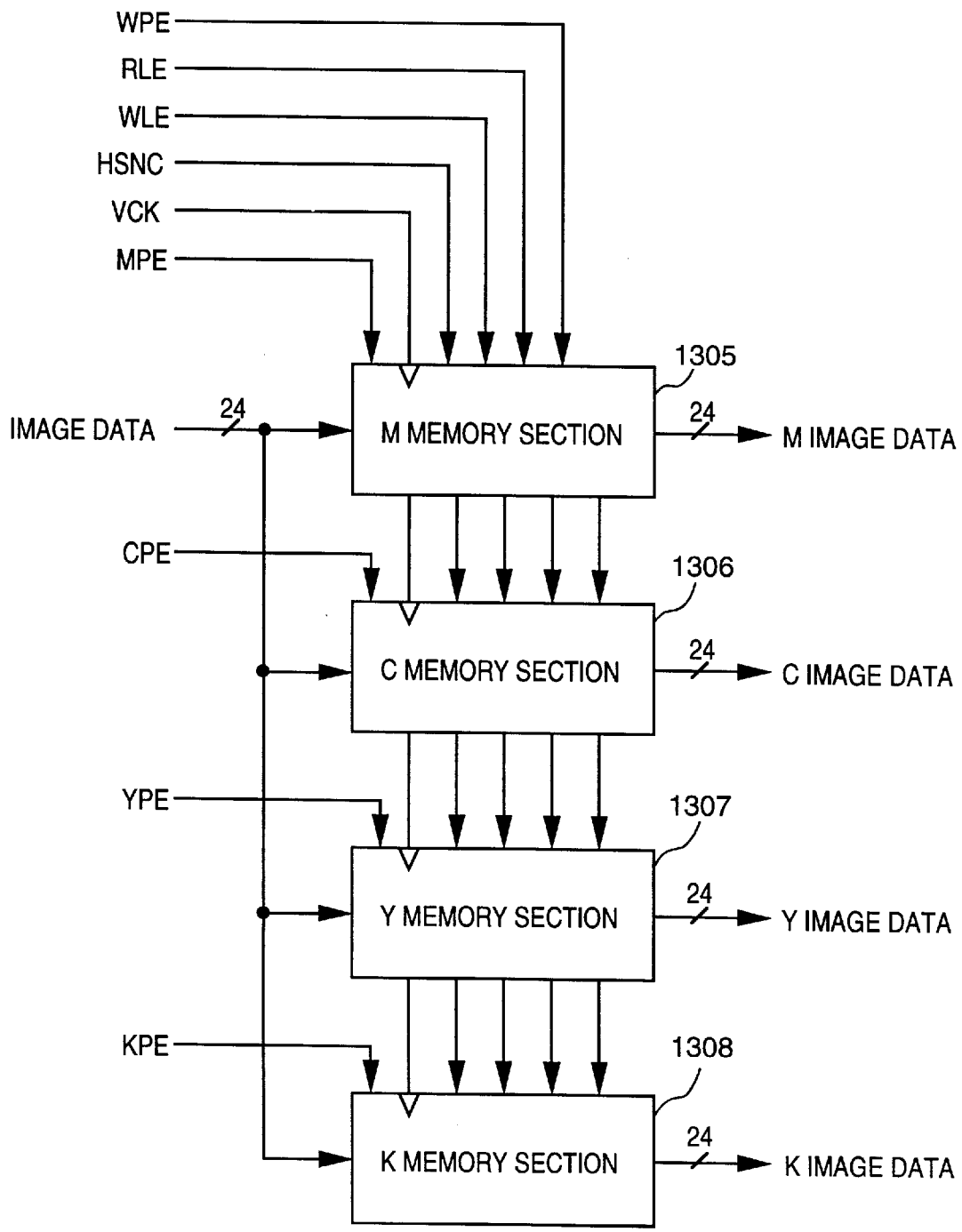
FIG. 13 is a block diagram showing the arrangement of an image memory unit 208 shown in FIG. 3.

FIG. 13 is a block diagram showing the arrangement of the image memory unit 208. The image memory unit 208 is constituted by M, C, Y, and K memory sections 1305, 1306, 1307, and 1308 including controllers and having identical arrangements.

Each memory section receives the main scanning synchronization signal HSNC and image clocks VCK, and also receives a main scanning write enable signal WLE, a main scanning read enable signal RLE, and a sub-scanning write enable signal WPE as common control signals. Furthermore, the M memory section 1305 receives a magenta sub-scanning read enable signal MPE, the C memory section 1306 receives a cyan sub-scanning read enable signal CPE, the Y memory section 1307 receives a yellow sub-scanning read enable signal YPE, and the K memory section 1308 receives a black sub-scanning read enable signal KPE.

Figure 14:
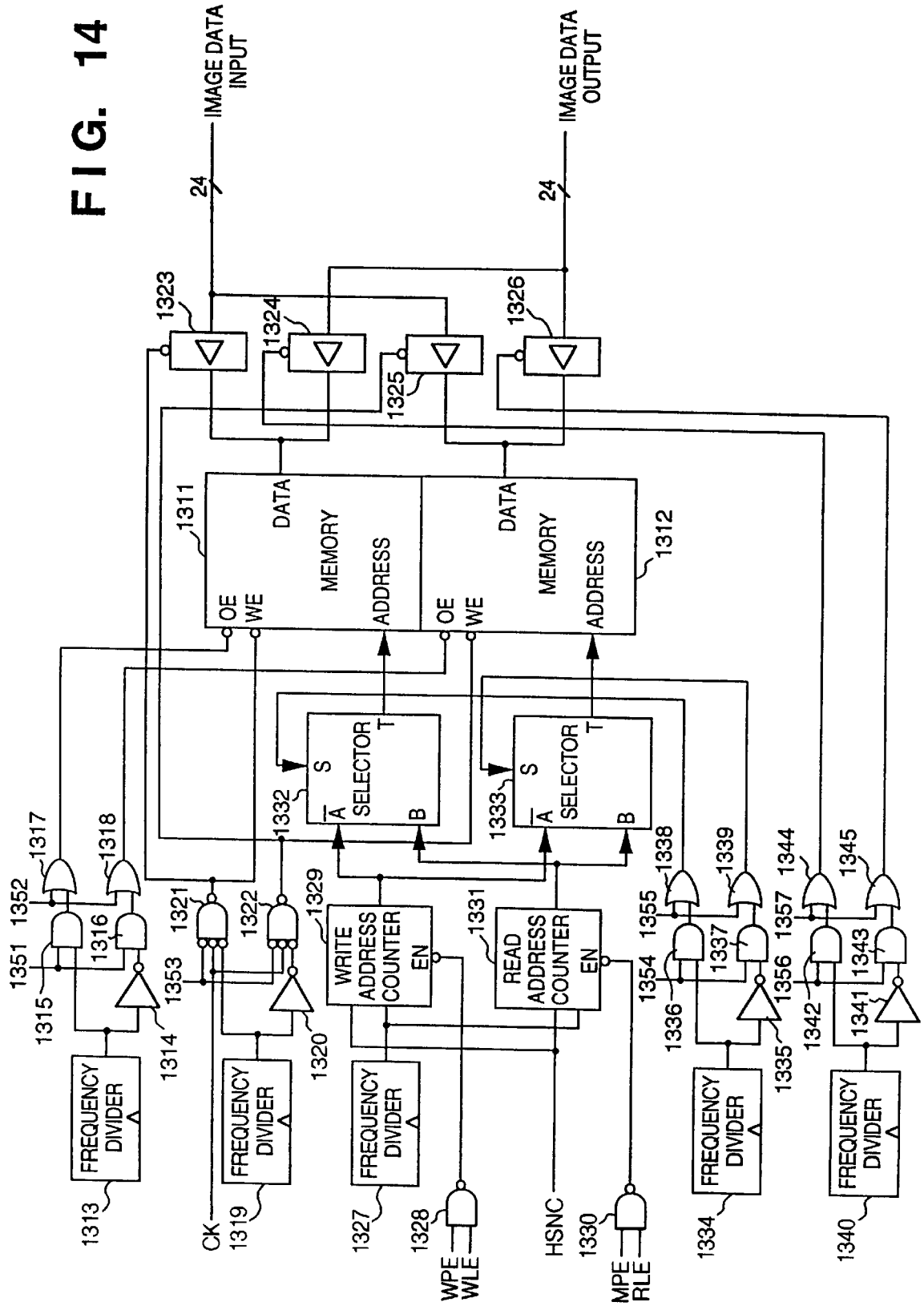
FIG. 14 is a block diagram showing the internal arrangement of a memory section for each color component shown in FIG. 13.

FIG. 14 is a block diagram showing the internal arrangement of each of the memory sections 1305 to 1308 for the respective color components. Each memory section includes two memories 1311 and 1312, and as will be described in detail later, both the read and write operations are controlled to perform toggle operations in units of pixels.

On the other hand, the controller is constituted by the following blocks. Note that each frequency divider frequency-divides the image clock VCK with 2.

(1) a block which is constituted by a frequency divider 1313, an inverter 1314, AND gates 1315 and 1316, and OR gates 1317 and 1318, and controls an enable signal OE;

(2) a block which is constituted by a frequency divider 1319, an inverter 1320, and OR gates 1321 and 1322, and controls a write enable signal WE and input drivers 1323 and 1325 of the two memories 1311 and 1312;

(3) a write address counter 1329 which counts the main-scanning synchronization signal HSNC and the output from a frequency divider 1327, and the output of which is enabled by the output from a NAND gate 1328 for NANDing the signals WPE and WLE;

(4) a read address counter 1331 which counts the main-scanning synchronization signal HSNC and the output from the frequency divider 1327, and the output of which is enabled by the output from a NAND gate 1330 for NANDing the signals MPE (or CPE, YPE, or KPE) and RLE;

(5) a block which is constituted by selectors 1332 and 1333 for selecting one of the counters 1329 and 1331 as the address of the memories 1311 and 1312, a frequency divider 1334 for controlling the selection, an inverter 1335, AND gates 1336 and 1337, and OR gates 1338 and 1339; and (6) a block which is constituted by a frequency divider 1340, an inverter 1341, AND gates 1342 and 1343, and OR gates 1344 and 1345, and controls output drivers 1324 and 1326 of the two memories 1311 and 1312.

The operations will be described below while being classified into three cases, i.e., a case wherein a first image is written in the memory, a case of the read modify write operation in which the first image is output from the memory, and an image obtained by synthesizing the output first image with a read second image is written in the memory, and a case wherein a third image is read out from the memory.

When First Image is Written in Memory

Figure 15:
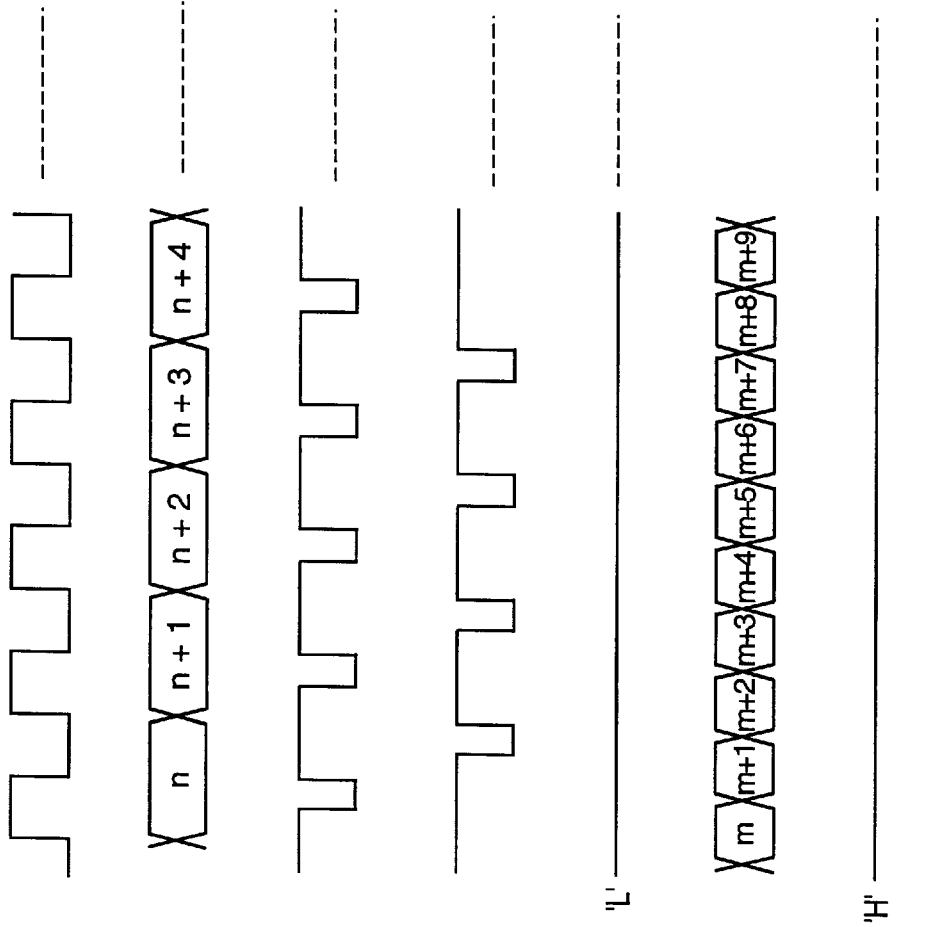
FIG. 15 is a timing chart showing the timings when a first image is written in a memory.

FIG. 15 is a timing chart showing the timings when the first image is written in the memory. In this case, the reader unit 101 reads an image of the first original, and writes the read image in the memory.

At this time, signals 1351 to 1357 supplied from the I/O port of the control unit 251 are set as follows, and as a result, the output from the write address counter 1329 is selected as the memory address, as shown in FIG. 15. Furthermore, the write accesses the memories 1311 and 1312 are attained by toggle operations in units of pixels.

1351="L"
1352="L"
1353="L"
1354="L"
1355="L"
1356=X
1357="H"

where X: do not care

When Read Modify Write is Performed

In this case, the reader unit 101 reads an image of the second original, the read image is synthesized with data read out from the memory before the read operation, and the synthesis result is stored in the memory again.

Figure 16:
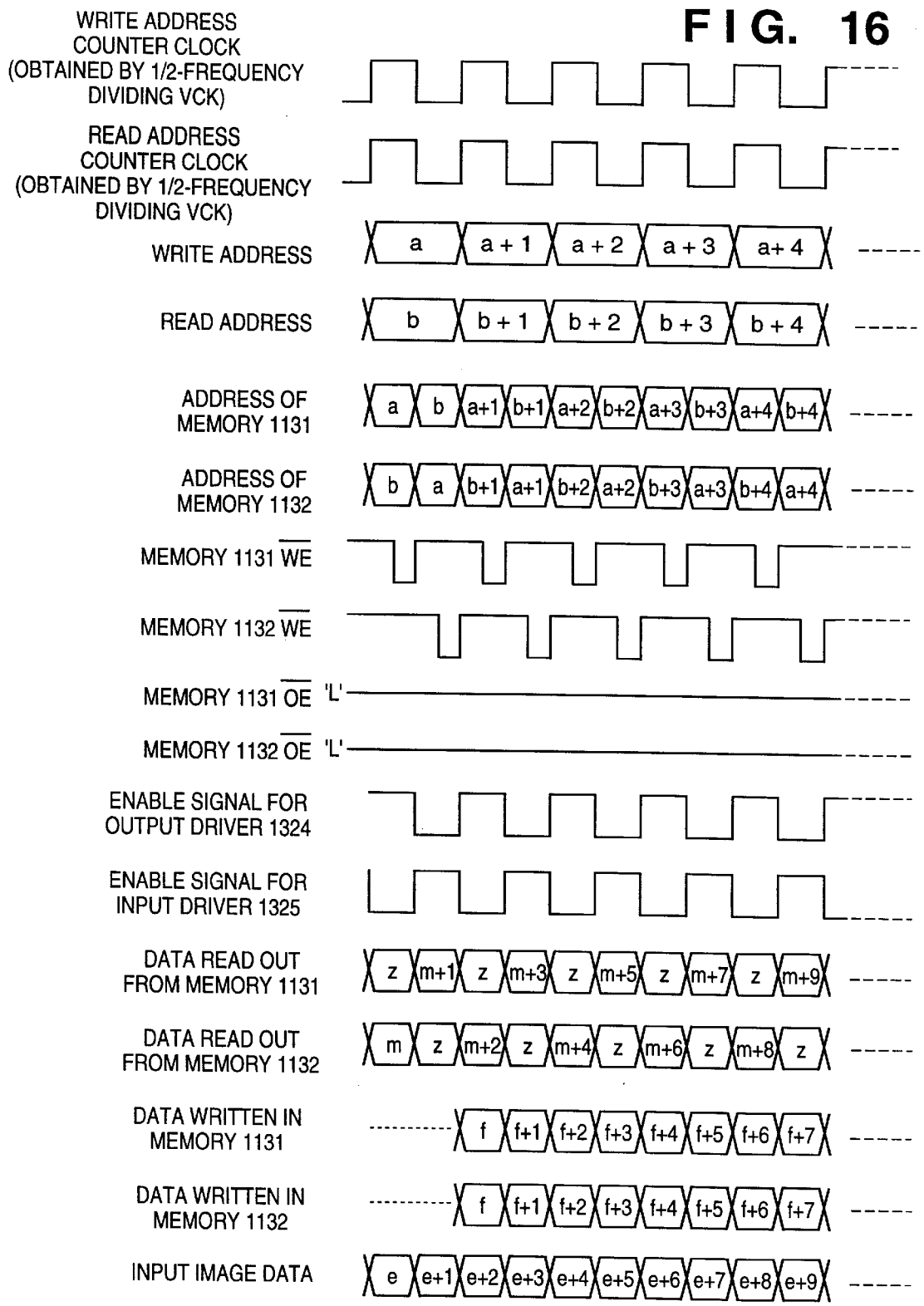
FIG. 16 is a timing chart showing the timings of the read modify write operation.

At this time, the signals 1351 to 1357 supplied from the I/O port of the control unit 251 are set as follows, and as a result, an operation for writing data in one memory and reading out data from the other memory at the same time is alternately performed, as shown in FIG. 16.

1351="L"
1352="L"
1353="L"
1354="H"
1355="L"
1356="H"
1357="L"

Furthermore, not only the signal WPE but also the signal MPE (CPE, YPE, or KPE) are synchronized with the signal DTOP. In FIG. 16, since the delay time required for data read out from and written in the memory is assumed to be two clocks, image data are alternately written in the memories in such a manner that the synthesis result of second image data e and first image data m is stored in the memory 1311 as data f, the synthesis result of second image data e+1 and first image data m+1 is stored in the memory 1312 as data f+1, and so on.

When Third Image is Read Out from Memory

When a third image, i.e., a final synthesis result, is to be output, the signals 1351 to 1357 supplied from the I/O port of the control unit 251 are set as follows, and as a result, the output from the read address counter 1331 is selected as the memory address. Furthermore, by controlling the enable signals OE of the two memories, data are alternately read out from the two memories in units of pixels.

1351="H"
1352="L"
1353="H"
1354=X
1355="H"
1356=X
1357="L"

When image data are output to the color LBP 216, the respective color components (C, M, Y, and K) are set in turn in a read enable state in synchronism with the rotation of the drums. However, in the preview mode, C, M, and Y color components are simultaneously set in a read enable state.

When only image synthesis is performed, no read modify write operation is required. However, with the above-mentioned arrangement, so-called "watermark synthesis" for synthesizing two images at given ratios can also be realized.

As described above, since the apparatus according to this embodiment has a mode of previewing an image obtained by performing color conversion processing (RGB system processing) for a read original image, a mode of previewing an image obtained by performing paint or free color processing (CMY system processing) for a read original image, and a mode of previewing an image synthesis result, an image nearly equivalent to a printed-out image can be previewed for all the image processing modes.

Note that the image processing apparatus may form latent images on a photosensitive drum using a plurality of image forming units.

In a case other than the synthesis result is displayed on the monitor in the preview mode, image data may be stored in the image memory. With this arrangement, although the throughput lowers, the selector 252 need not be arranged, thus reducing the circuit scale.

Note that the image memory unit 208 in the above described embodiment can also have a compression function and an expansion function to store compressed data in the memory.

For instance, image data C, M and Y can be converted to image data L*, a* and b* respectively, compressed by block coding e.g. JPEG and stored. When a normal mode (copy mode) is set, the compressed block data in different positions is read, expanded, converted to image data C, M and Y, and outputted in each channel which corresponds to each of an image forming unit, in order to compensate a position error for each of the image forming unit and to synchronize recording. When a preview mode is set, the compressed block data in a same position is read.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having a plurality of image forming units for forming an image, comprising:

input means for inputting image data;

storage means for storing the image data; and read-out means for reading out a plurality of image data from said storage means in parallel, wherein said read-out means reads out the plurality of image data different from each other in correspondence with a difference of image forming positions caused by position differences between the image forming units in an image forming mode, and reads out the plurality of image data as the same in an image displaying mode.

2. The apparatus according to claim 1, wherein the plurality of image forming units respectively correspond to a plurality of recording agents of different colors.

3. The apparatus according to claim 1, further comprising:

generation means for generating image data, which represents an original image and consists of a plurality of component signals, by exposing and scanning the original image; and color processing means for performing color processing for the image data generated by said generation means, wherein said color processing means performs color processing using a single color processing unit for the image data, and outputs the processed data to said storage means.

4. The apparatus according to claim 1, further comprising area signal generation means for generating a control signal for controlling a read access of image data by said read-out means.

5. The apparatus according to claim 4, wherein said area signal generation means generates a control signal indicating a read-out position in a sub-scanning direction in correspondence with the difference of image forming positions caused by the position differences between the image forming units in the image forming mode.

6. The apparatus according to claim 1, further comprising image processing means for performing image processing for image data read out from said storage means, wherein said image processing means has a plurality of image processing units corresponding to the plurality of image forming units.

7. The apparatus according to claim 6, wherein said image processing means has functions of performing masking processing and image edit processing, and performs at least the masking processing for the image data input in the image forming mode.

8. The apparatus according to claim 6, wherein said image processing means has functions of performing image edit processing and inverse LOG conversion, and performs at least the inverse LOG conversion for the image data input in the image displaying mode.

9. An image processing method for an image processing apparatus having a plurality of image forming units which form an image, comprising the steps of:

inputting image data;

storing the image data into a storage unit;

reading out in parallel, a plurality of image data different from each other in correspondence with a difference of image forming positions caused by position differences between the image forming units from said storage means in an image forming mode; and reading out in parallel, a plurality of image data as the same from said storage means in an image displaying mode.

10. An image processing method for an image processing apparatus connected to an image forming apparatus having a plurality of image forming units which form an image, comprising the steps of:

inputting image data;

storing the image data into a storage unit;

reading out in parallel, a plurality of image data different from each other in correspondence with a difference of image forming position caused by position differences between the image forming units from said storage means in an image forming mode; and reading out in parallel, a plurality of image date as the same from said storage means in an image displaying mode.

11. An image processing apparatus connected to an image forming apparatus having a plurality of image forming units for forming an image, comprising:

input means for inputting image data;

storage means for storing the image data; and read-out means for reading out a plurality of image data from said storage means in parallel, wherein said read-out means reads out the plurality of image data different from each other in correspondence with a difference of image forming positions caused by position differences between the image forming units in an image forming mode, and reads out the plurality of image data as the same in an image displaying mode.

12. The apparatus according to claim 11, further comprising:

generation means for generating image data, which represents an original image and consists of a plurality of component signals, by exposing and scanning the original image; and color processing means for performing color processing for the image data generated by said generation means, wherein said color processing means performs color processing using a single color processing unit for the image data, and outputs the processed data to said storage means.

13. The apparatus according to claim 11, wherein the plurality of image forming units respectively correspond to a plurality of recording agents of different colors.

14. The apparatus according to claim 11, further comprising area signal generation means for generating a control signal for controlling a read access of image data by said read-out means.

15. The apparatus according to claim 14, wherein said area signal generation means generates a control signal indicating a read-out position in a sub-scanning direction in correspondence with the difference of image forming positions caused by the position differences between the image forming units in the image forming mode.

16. The apparatus according to claim 11, further comprising image processing means for performing image processing for image data read out from said storage means, wherein said image processing means has a plurality of image processing units corresponding to the plurality of image forming units.

17. The apparatus according to claim 16, wherein said image processing means has functions of performing masking processing and image edit processing, and performs at least the masking processing for the image data input in the image forming mode.

18. The apparatus according to claim 16, wherein said image processing means has functions of performing image edit processing and inverse LOG conversion, and performs at least the inverse LOG conversion for the image data input in the image displaying mode.

* * * * *